July 9, 1929.  C. S. SANDERS  1,720,294
THERMOSTATIC SWITCH
Filed Aug. 22, 1927  2 Sheets-Sheet 2

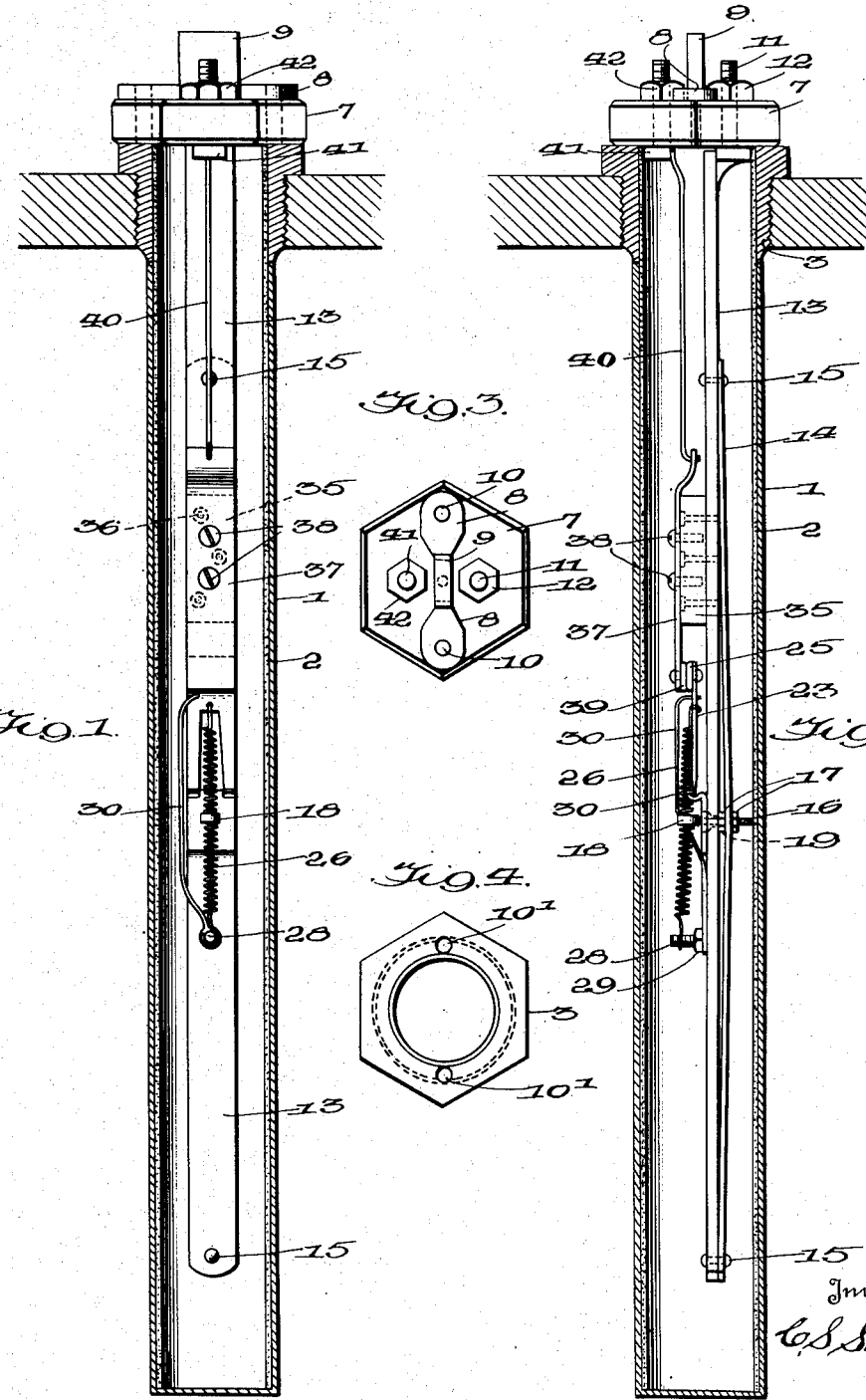

Inventor
C. S. Sanders
O'Neill & Bunn
Attorneys

Patented July 9, 1929.

1,720,294

UNITED STATES PATENT OFFICE.

CLYDE S. SANDERS, OF MIDWEST, WYOMING, ASSIGNOR TO THE MIDWEST REFINING COMPANY, OF DENVER, COLORADO, A CORPORATION OF MAINE.

THERMOSTATIC SWITCH.

Application filed August 22, 1927. Serial No. 214,739.

The invention relates to thermostatic switches and has for its object to provide a relatively simple and highly efficient quick action electric switch operatively connected with the thermostat, which opens and closes an electric circuit in accordance with prescribed or predetermined variations in temperature, the apparatus being preferably mounted in an enclosing casing to permit of the same being immersed in a liquid, the temperature of which controls the action of the thermostat, which latter operates the electric switch.

The invention is illustrated in the accompanying drawings, in which:—

Fig. 1 is a sectional elevation of the device.

Fig. 2 is a similar view taken at right angles to that in Fig. 1.

Fig. 3 is a plan view.

Fig. 4 is a plan view of the casing.

Fig. 5 is an enlarged fragmentary side elevation of the thermostat and switch showing the switch in closed position.

Fig. 6 is a similar view showing the switch in open position.

Fig. 7 is a fragmentary front elevation of the thermostat and switch.

The particular type of thermostatic switch illustrated is designed primarily for controlling the temperature of liquid contained in or flowing through a heating device, the heat of the latter being supplied by an electric current controlled by the switch, but it will be understood that the thermostatic switch is capable of general application, when it is desired to make and break an electric circuit at the switch by and in accordance with predetermined temperature variations to which the thermostatic element is subjected.

Referring to the drawings, 1 indicates a tubular casing, preferably of metal, such as brass, aluminum or the like, provided with a lining 2 of fiber, or similar insulating material, adapted, when desired, to contain a body of oil to prevent arcing between the switch contacts, when the latter are separated. The upper end of the casing is provided with a flanged and threaded nipple 3 by means of which the casing may be removably mounted in a heater or other container of liquid, the temperature of which is to be regulated.

Secured to the flange of the nipple 3, by bolts engaging registering bolt holes 10 and 10' is a fiber cap 7, in which is mounted a bolt 11 secured in position by a nut 12, which bolt and nut constitute the primary support for the thermostatic switch and also one terminal connection for the electric circuit. The fiber cap also carries a second bolt 41 and nut 42, which constitutes the other terminal connection for the electric circuit, and disposed between the two terminal bolts 11 and 41 is a barrier 9 of fiber or the like, provided with horizontal feet 8 having perforations registering with the perforations in the cap 7 to receive the bolts by means of which the cap is secured to the casing.

Brazed or otherwise secured to the head of the bolt 11 is a strip or bar 13, preferably of rolled steel or the like, which extends down into the casing and is supported in general parallelism with the longitudinal axis of the casing. Fixed at its ends, preferably by rivets 15, to the base strip 13 is a second strip of metal 14, preferably of brass, aluminum or other metal having a different coefficient of expansion from that of the base strip 13, said strip 14 being held by its connections with the base strip, normally in bowed relation to the latter, the extent of the bowing or curvature of the strip 14 being determined by the temperature to which the two elements 13 and 14 of the thermostat are subjected. The two bars thus assembled and connected constitute a bimetal thermostatic element in which the bar 14 responds to temperature variations by an increase or decrease of curvature in respect of the flat base strip 13.

Secured in an opening intermediate the ends of the strip 14 is a threaded eye bolt 16, which is adjustable transversely of the bar 14 by means of set nuts 17, said bolt passing through an enlarged opening 19 in the bar 13, so that the eye 18 of the bolt extends beyond the bar 13 on the side opposite that to which the bar 14 is attached.

Secured to the face of the bar 13 by rivets 21 is a plate 20 having a perforation in alignment with the opening 19 in the said bar, the upper end of the plate having two laterally spaced arms 22, which constitute fulcrum supports for the removable switch or contact arm 23, which latter is bifurcated or forked throughout the greater portion of its length and is provided at the end of each leg with a knife edge bearing 24, which engage depressions in the arms 22, as more particularly shown in Figs. 5 and 6. The upper portion of said switch arm 23 carries a contact 25.

The switch arm 23 is adapted to be rocked on its fulcrum support in the bracket arms 22 by means of a kick spring 26, which latter is preferably in the form of an elongated helical spring having one end hooked through an opening 27 in the upper part of the switch arm and its opposite end anchored to a screw threaded stud 28 secured to the lower portion of the base strip 13, the lower hooked end of the spring being adapted to be engaged with the bolt 29 at various positions in the length of the bolt to vary the range of action of the spring. To increase the range, the connection between the lower hooked end of the spring and the stud is moved toward the end of the latter, and, conversely, to decrease the range of action of the spring, the connection is moved inward toward the strip 13.

The bolt 28 is provided with a nut 29, which serves to lock the same rigidly to the strip 13 and also constitutes means for securing a flexible lead wire 30 to said strip 13, the opposite end of said lead wire being connected to the upper end of the switch arm 23 adjacent contact 25.

The kick spring 26 passes through the eye 18 of the bolt 16, the interior of the eye engaging the convolutions of the spring and causing the spring to partake of the movements of the bolt 16 due to the flexing of the bowed strip 14 of the thermostatic element under varying temperature conditions.

Riveted to the face of strip 13 above the pivoted switch arm 23 is an insulating block 35 to which is secured a metallic plate 37 by means of screws or the like, upon the lower end of which strip is fastened a fixed contact 39 adapted to be engaged by the movable contact 25 on the switch arm 23. The upper end of the plate 37 is connected by a lead 40 with the bolt 31 mounted in the cap 7, as hereinbefore described.

The operation of the apparatus as hereinbefore described is as follows: When the device is used for controlling the temperature of oil passing through an electric heater placed in the flow line between the well and stock tanks, the casing containing the thermostatic switch is secured in the heating tank by means of the threaded nipple 3 on the casing, so that the device is immersed in the oil. If the temperature of the oil increases beyond a predetermined point, the bowing or curvature of the thermostatic strip 14 is increased and the mid section of said strip moves away from base strip 13 and the eye bolt 16 causes the helical kick spring 26 to move in the same direction until a portion of the longitudinal axis of the spring moves to the right of the fulcrum point of the switch arm 23, as indicated in Fig. 6, when the pull of the spring will be effective to snap the switch arm 23 quickly to the right and thereby disengaging contacts 25 and 39 and breaking the circuit. When the temperature of the oil decreases to a predetermined point, the thermostatic strip 14 moves toward strip 13 and the eye bolt 16 moves the mid section of the kick spring 26 in the same direction until the longitudinal axis of the spring is out of alignment with the fulcrum point of the switch arm 23, as shown in Fig. 5, when the pull of the spring will swing the switch arm in a direction to cause contact 25 to engage contact 39 and close the electric circuit, which will remain closed until the temperature of the oil again increases above the predetermined maximum. Calibration of the thermostat to effect opening and closing of the switch at predetermined temperatures is effected by adjusting the eye bolt 16 transversely of the thermostatic strip 14 and locking said eye bolt in its adjusted position by means of the set nuts 17. In order to increase or decrease the range of action of the thermostat; that is to say, to vary the temperature range through which the device is effective, the lower end of the kick spring 26 is adjusted inwardly or outwardly on the threaded bolt 28. To increase the range, the anchoring hook on the lower end of this spring is adjusted toward the outer end of the stud 28 and, to decrease the range of control, the hooked lower end of the spring is moved inwardly on the stud 28 toward the strip 13.

While the apparatus has been described as associated with an enclosing casing which adapts the same to the regulation of temperatures of liquids, it is to be understood that the thermostatic switch is capable of general application where heat control is effected by means of electrically actuated instrumentalities. It is furthermore obvious that the thermostatic switch may be employed without the enclosing casing where the conditions permit of such use.

What I claim is:

1. A thermostatic switch comprising a bimetal thermostatic element including a flat base strip and a relatively bowed strip, fixed and movable contacts carried by the base strip, a kick spring attached to the base strip and to the movable contact to move the latter, and a connection between the bowed strip and the spring; whereby movements of said strip toward and from the base strip will effect commensurate movements of the kick spring and switch opening and closing movements of the movable contact.

2. A thermostatic switch comprising a bimetal thermostatic element including a flat base strip and a relatively bowed strip secured at its ends to the base strip, fixed and movable contacts carried by the base strip, a kick spring attached to the base strip and to the movable contact to move the latter, and a connection between the bowed strip and the spring; whereby movements of said strip toward and from the base strip will effect commensurate movements of the kick spring and switch opening and closing movements of the movable contact.

3. A thermostatic switch comprising a bimetal thermostatic element including a flat base strip and a relatively bowed strip secured at its ends to the base strip, a fixed contact spaced from the base strip, a movable contact arm fulcrumed at one end on the base strip, a kick spring connected at its ends to said arm and base strip, respectively, and means connecting the intermediate portions of the bowed strip and the spring; whereby movements of said strip toward and from the base strip will effect commensurate movements of the kick spring and switch opening and closing movements of the movable contact.

4. A thermostatic switch comprising a bimetal thermostatic element including a flat base strip and a relatively bowed strip secured at its ends to the base strip, a fixed contact spaced from the base strip, a movable contact arm fulcrumed at one end on the base strip, a kick spring connected at its ends to said arm and base strip respectively, and a stud connecting the bowed strip and spring intermediate the ends thereof; whereby movements of said strip toward and from the base strip will effect commensurate movements of the kick spring and switch opening and closing movements of the movable contact.

5. A thermostatic switch comprising a bimetal thermostatic element including a flat base strip and a relatively bowed strip secured at its ends to the base strip, a fixed contact spaced from the base strip, a movable contact arm fulcrumed at one end on the base strip, a kick spring connected at its ends to said arm and base strip respectively, and a stud adjustably connected to the bowed strip intermediate its ends and engaging said spring; whereby movements of said strip toward and from the base strip will effect commensurate movements of the kick spring and switch opening and closing movements of the movable contact.

6. A thermostatic switch comprising a bimetal thermostatic element including a flat base strip and a relatively bowed strip secured at its ends to the base strip, a fixed contact spaced from the base strip, a movable contact arm fulcrumed at one end on the base strip, a kick spring connected at its ends to said arm and base strip respectively, and an eye bolt having a threaded end adjustably mounted in the bowed strip intermediate the end thereof and its eye engaged by the kick spring; whereby movements of said strip toward and from the base strip will effect commensurate movements of the kick spring and switch opening and closing movements of the movable contact.

7. A thermostatic switch comprising a bimetal thermostatic element including a flat base strip and a relatively bowed strip secured at its ends to the base strip, a fixed contact spaced from the base strip, a movable contact arm fulcrumed at one end on the base strip, a helical kick spring connected at its ends to said arm and base strip respectively, and an eye bolt having a threaded end adjustably mounted in the bowed strip intermediate the end thereof and its eye engaged by the kick spring; whereby movements of said strip toward and from the base strip will effect commensurate movements of the kick spring and switch opening and closing movements of the movable contact.

8. A thermostatic switch comprising a bimetal thermostatic element including a flat base strip and a relatively bowed strip secured at its ends to the base strip, a fixed contact spaced from the base strip, a movable contact arm fulcrumed at one end on the base strip, a helical kick spring connected at one end of said arm, a stud on said base strip to which the opposite end of said spring is adjustably attached to vary the range of action of said spring, and a connection between the mid sections of said bowed strip and spring; whereby movements of said strip toward and from the base strip will effect commensurate movements of the kick spring and switch opening and closing movements of the movable contact.

9. A thermostatic switch comprising a bimetal thermostatic element including a flat base strip and a relatively bowed strip secured at its ends to the base strip, a fixed contact spaced from the base strip, a movable contact arm fulcrumed at one end on the base strip, a helical kick spring connected at one end to said arm, a stud on said base strip to which the opposite end of said spring is adjustably attached to vary the range of action of said spring, and an adjustable connection between the mid sections of said bowed strip and spring; whereby movements of said strip toward and from the base strip will effect commensurate movements of the kick spring and switch opening and closing movements of the movable contact.

In testimony whereof I affix my signature.

CLYDE S. SANDERS.